United States Patent
Yoshikawa et al.

(10) Patent No.: US 7,219,012 B2
(45) Date of Patent: May 15, 2007

(54) NAVIGATION SYSTEMS, METHODS, AND PROGRAMS

(75) Inventors: Kazutaka Yoshikawa, Okazaki (JP); Kenji Nagase, Okazaki (JP); Hiroshi Tomita, Anjyo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 11/482,719

(22) Filed: Jul. 10, 2006

(65) Prior Publication Data

US 2007/0050133 A1    Mar. 1, 2007

(30) Foreign Application Priority Data

Jul. 11, 2005    (JP)    ............................. 2005-201777

(51) Int. Cl.
  *G01C 21/30*    (2006.01)
(52) U.S. Cl. ...................................... 701/209; 701/211
(58) Field of Classification Search ................ 701/200, 701/201, 202, 208, 210, 211, 213, 117, 300; 340/988–995.27
  See application file for complete search history.

(56) References Cited

U.S. PATENT DOCUMENTS

| 6,785,606 | B2 * | 8/2004 | DeKock et al. | .............. 701/117 |
| 7,031,829 | B2 * | 4/2006 | Nisiyama | ..................... 701/209 |
| 7,031,983 | B2 * | 4/2006 | Israni et al. | ............. 707/104.1 |
| 7,072,764 | B2 * | 7/2006 | Donath et al. | .............. 701/200 |

FOREIGN PATENT DOCUMENTS

JP    A 2004-271375    9/2004

* cited by examiner

*Primary Examiner*—Richard M. Camby
(74) *Attorney, Agent, or Firm*—Oliff & Berridge, PLC

(57) ABSTRACT

Navigation systems, methods and programs for a vehicle detect a number of travel lanes available for traveling in a direction that the vehicle is traveling. The systems, methods, and programs detect a lane in which the vehicle is currently located and determine a congestion degree for each of the available travel lanes. The systems, methods, and programs determine a degree of difficulty of turning right or left at a next intersection that the vehicle is approaching based on the detected number of available travel lanes, the detected lane in which the vehicle is currently located, and the detected congestion degree. The systems, methods, and programs select a travel route in accordance with the determined degree of difficulty and provide guidance information on the selected travel route.

20 Claims, 5 Drawing Sheets

NAVIGATION SYSTEMS, METHODS, AND PROGRAMS

The disclosure of Japanese Patent Application No. 2005-201777, filed on Jul. 11, 2005, including the specification, drawings and abstract thereof, is incorporated herein by reference in its entirety.

BACKGROUND

1. Related Technical Fields

Related technical fields include navigation systems, methods, and programs that determine a degree of difficulty of turning right or left at an intersection that vehicle is approaching.

2. Description of the Related Art

Japanese Unexamined Patent Application Publication No. 2004-271375 discloses a navigation apparatus capable of providing information on a route. The route is selected depending on the number of times a vehicle has to change a lane to make a right/left turn at an intersection. In the navigation apparatus disclosed in Japanese Unexamined Patent Application Publication No. 2004-271375, detection of the congestion degree of lanes is not performed.

SUMMARY

The distance to run before making a lane change varies depending on the congestion degree of lanes. For example, when a lane a vehicle is currently traveling in is not congested but an adjacent lane is congested, it will be advantageous to run a longer distance before making a lane change. Therefore, when there is congestion in some of the lanes in a direction in which a vehicle is traveling, it is not possible with the navigation apparatus disclosed in Japanese Unexamined Patent Application Publication No. 2004-271375 to accurately determine the degree of difficulty of turning right or left at an intersection the user's vehicle is approaching.

Navigation systems, methods, and programs may accurately assesses the degree of difficulty of turning right or left at an intersection that a vehicle is approaching and may suggest a suitable traveling route depending on the assessed degree of difficulty of turning right or left.

Navigation systems, methods, and programs may detect a number of travel lanes available for traveling in a direction that the vehicle is traveling. The systems, methods, and programs may detect a lane in which the vehicle is currently located and determine a congestion degree for each of the available travel lanes. The systems, methods, and programs may determine a degree of difficulty of turning right or left at a next intersection that the vehicle is approaching based on the detected number of available travel lanes, the detected lane in which the vehicle is currently located, and the detected congestion degree. The systems, methods, and programs may select a travel route in accordance with the determined degree of difficulty and may provide guidance information on the selected travel route.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 2:
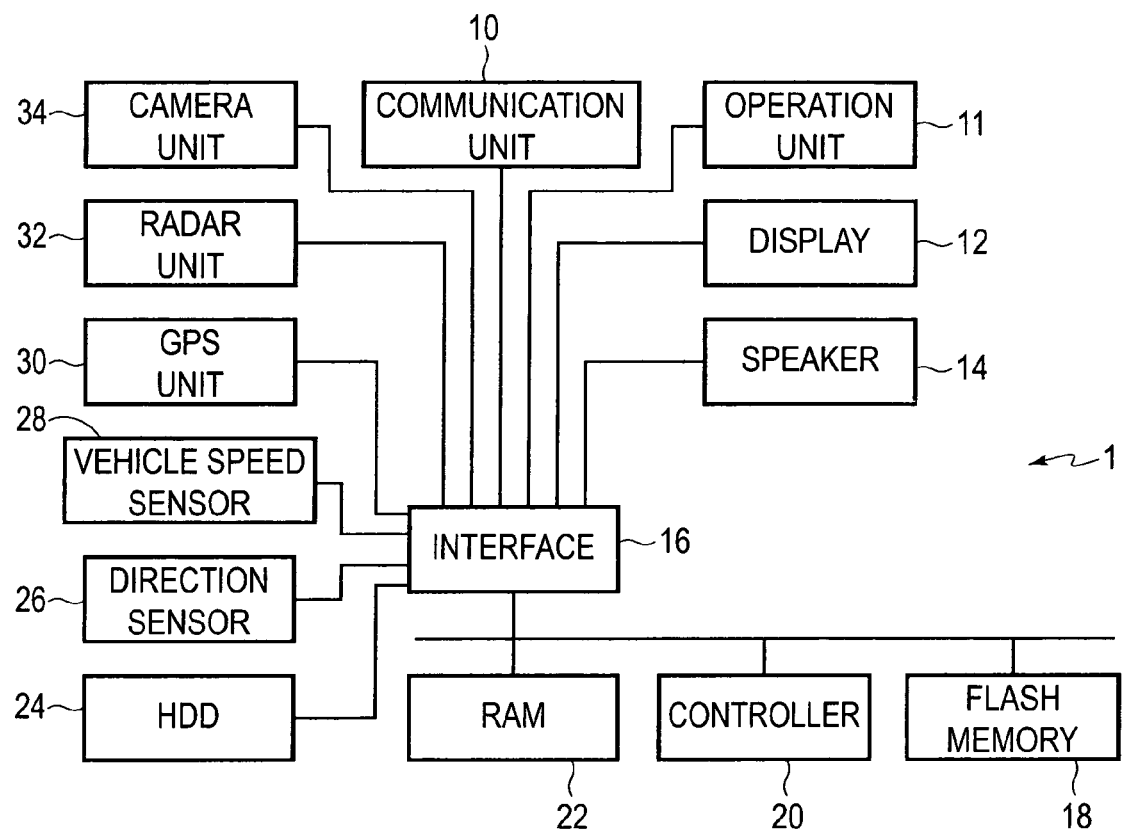
FIG. 2 is a block diagram showing an exemplary navigation system.

FIG. 2 is a block diagram showing an exemplary configuration of a navigation system 1. The navigation system 1 may be installed in a vehicle such as, for example, a car or a motorcycle.

The navigation system 1 may include a memory 24, such as for example, a hard disk drive (HDD). A map database DB is may be stored in memory 24. The navigation system may include, for example, a controller 20 (such as, for example, a CPU), a direction sensor 26, a vehicle speed sensor 28, a GPS unit 30, a radar unit 32, a camera unit 34, a communication unit 10, an operation unit 11, a display 12, a speaker 14, a RAM 22, and/or a flash memory 18.

The direction sensor 26 may include, for example, a geomagnetic sensor, a right-left wheel speed difference sensor, a vibrating gyroscope, a gas rate gyroscope, and/or an optical fiber gyroscope, which may be used in dead reckoning navigation (as compared to GPS navigation).

The vehicle speed sensor 28 may be for use in the dead reckoning navigation and may be used, for example, to assess the degree of difficulty of turning right or left. A vehicle speed sensor used as or with a speedometer may be used for this purpose. The driving distance may be determined by integrating the vehicle speed with respect to time. As for the vehicle speed sensor, for example, a vehicle speed sensor that detects the vehicle speed based on the wheel rotation speed, a Doppler vehicle ground speed sensor using a radio wave or an ultrasonic wave, and/or a vehicle ground speed sensor using light and a spatial filter may be used. The congestion degree of the lane in which the vehicle is traveling may be detected based on the speed of the vehicle. Therefore, the vehicle speed sensor 28 may also be used to determine a congestion degree.

The GPS unit 30 may include, for example, an antenna for receiving data transmitted from navigation satellites and an ASIC or the like for outputting latitude-longitude data indicating the current position of the vehicle.

The radar unit 32 may be used to detect a congestion degree by the detecting vehicle speed of vehicles traveling in other lanes parallel to the lane in which the user's vehicle is traveling. For example, an optical radar or a radio radar may be used as the radar unit 32. Alternatively, a camera may be used to take an image of vehicles traveling in other lanes parallel to the line in which the user's vehicle is traveling. The congestion degree of the lanes parallel to the lane in which the user's vehicle is traveling can be detected based on the speed of the user's vehicle and the speeds, relative thereto, of vehicles traveling in the other lanes parallel to the lane in which the user's vehicle is traveling. Because the traveling distance needed to travel to make one lane change increases with the relative speeds of vehicles traveling in other parallel lanes, the degree of difficulty of turning right or left may be calculated based on the relative speeds of the vehicles traveling in other parallel lanes with respect to the speed of the user's vehicle.

The camera unit 34 may include, for example, a CCD camera or a CMOS camera and may be used to detect in which lane the user's vehicle is traveling. An image of a road surface behind the user's vehicle may be taken by the camera unit 34, and the lane in which the user's vehicle is traveling may be detected by extracting white lines marked on the road surface. The lane in which the user's vehicle is traveling may be also be detected by detecting a lane marker with, for example, a guide cable, a magnetic marker, and/or a reflector, if the road has lane markers of such a type.

The communication unit 10 may include a transmitter and a receiver for communicating with a nearby vehicle and/or a traffic information center via a radio wave or light and may be used to detect lanes and congestion degree. It is possible to acquire information indicating the congestion degree of each lane of a link or the congestion degree of the link as a whole of a road network where the user's vehicle is present via road-vehicle communication in a communication zone with a traffic information center or via FM broadcast. Vehicle-vehicle communication allows the detection of the congestion degree of a lane in which a nearby vehicle is traveling, based on the traveling speed of the nearby vehicle. The vehicle—vehicle communication may be realized by a combination of road-vehicle communication in a communication zone with the traffic information center and vehicle—vehicle communication between the user's vehicle and nearby vehicles.

As used herein, the term "link" refers to, for example, a road or portion of a road. For example, according to one type of road data in the map DB, each road may consist of a plurality of componential units called links. Each link may be separated and defined by, for example, an intersection, an intersection having more than three roads, a curve, a highway entry point, and/or a point at which the road type changes. As used herein the term "node" refers to a point connecting two links. A node may be, for example, an intersection, an intersection having more than three roads, a curve, a highway entry point, a dead end and/or a point at which the road type changes.

The operation unit 11 may be realized by, for example, a remote controller or an operation panel and may be used to input data to specify a destination or a command such as, for example, a route search start command, and a route re-search start command. Commands and/or data may be input via a voice and the input voice commands or data may be subjected to speech recognition.

The display 12 may provide guidance and may be realized by, for example, a flat panel display (FPD) and/or a heads-up display for displaying a map and a suggested traveling route.

The speaker 14 12 may provide guidance and may output voice information associated with the traveling route. A general audio system speaker may be used in common as the speaker 14 and/or a dedicated speaker may be provided.

The interface 16 may include, for example, an analog-to-digital converter and/or a digital-to-analog converter and may serve to convert the format of signals transmitted between the controller 20 and the various units, sensors, and other components described above.

The RAM 22 may temporarily store, for example, data and/or a program processed or executed by the controller 20. The flash memory 18 may be, for example, a nonvolatile memory such as an EEPROM, in which a control program executed by the controller 20 may be stored. A control program may also be stored, for example, in the memory 24. A control program may be stored into the flash memory 18 or the memory 24, for example, by downloading the control program from a particular server via a network or by reading from a computer-readable storage medium such as a removable memory (not shown).

The controller 20 may control various parts of the navigation system 1, for example, by executing one or more control programs.

Figure 3:
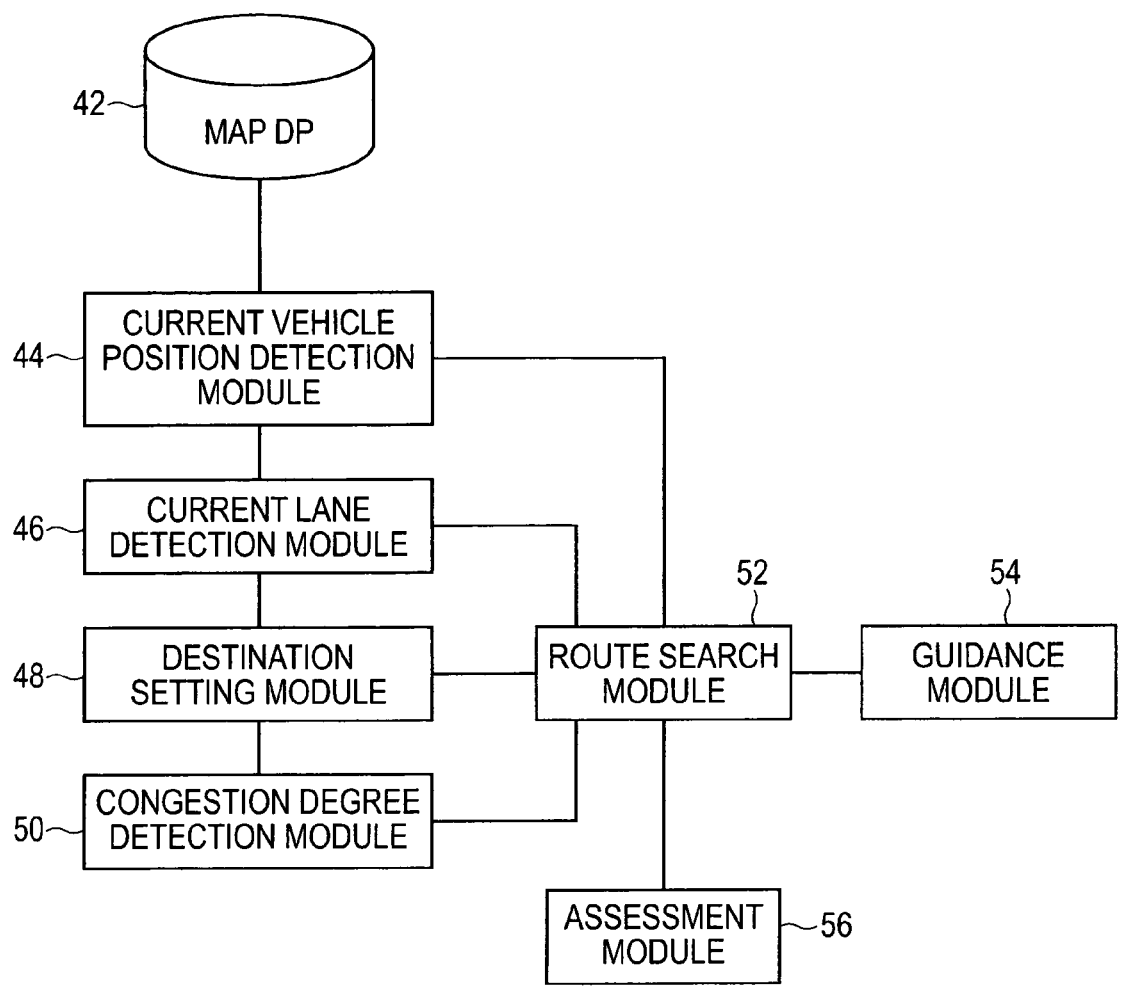
FIG. 3 is a block diagram showing an exemplary software configuration.

FIG. 3 is a block diagram showing an exemplary software configuration of, for example, a control program executed by the navigation system 1. The program may include, for example, a destination setting module 48, a map database 42, a vehicle position detection module 44, a current lane detection module 46, a congestion degree detection module 50, a route search module 52, an assessment module 56, and/or a guidance module 54.

The destination setting module 48 may be, for example, a module for setting a destination in accordance with a command/data input via the operation unit 11. In a case in which information other than latitude-longitude data, such as, for example, a telephone number, is input as information for specifying a destination via the operation unit 11, the destination setting module 48 may enable the retrieving of corresponding latitude-longitude data based on the telephone number or the like and the setting of the destination according to the retrieved latitude-longitude data.

The map database 42 may be, for example, a database in which digital information associated with a map described in the form of a graph is stored, and may be used, for example, to detect the position of the vehicle on the road network, to detect the number of lanes, to search for a traveling route, and/or to display the traveling route. The map database 42 may include for example data representing links, nodes, and their respective attributes.

The vehicle position detection module 44 may enable the calculation of the position of the vehicle on the road network, for example, based on data indicating the current vehicle position in latitude and longitude input from the GPS unit 30, the traveling speed input from the vehicle speed sensor 28, and/or the traveling direction input from the direction sensor 26, while enabling a correction of the position by means of map matching using the map database 42.

The current lane detection module 46 may be a program module that allows the controller 20 to function to detect lanes. More specifically, the current lane detection module 46 may enable the analysis of image data of a view behind the vehicle input from the camera unit 34, recognition of white broken lines indicating boundaries of traveling lanes and recognition of a solid white line indicating a boundary with opposite lanes by means of edge extraction and/or template matching, and/or detection of the lane in which the vehicle is traveling based on the detected white lines taking into account the number of lanes described in the map database 42.

The congestion degree detection module 50 may be a program module that allows the controller 20 to determine a congestion degree. The congestion degree detection module 50 may enable the detection of the congestion degree of the lane in which the user's vehicle is traveling or the congestion degree of lanes parallel to the lane in which the user's vehicle is traveling based on, for example, the traveling speed of the user's vehicle, the traffic congestion information received via the communication unit 10 from VICS®, the traveling speed of nearby vehicles acquired via vehicle—vehicle communication, and/or the relative speed of vehicles traveling in other lines parallel to the lane in which the user's vehicle is traveling.

The route search module 52 may be a program module that allows the controller 20 to function as route search means. More specifically, the route search module 52 may, for example, enable the searching of the map database 42 for a traveling route from a start point to a destination along links starting from a node or a link corresponding to the current position to a node or the link corresponding to the destination.

The assessment module 56 may be a program module that allows the controller 20 to as a degree of difficulty in turning. The assessment module 52 may enable the assessment of the degree of difficulty of turning right or left at an intersection that the user's vehicle is approaching, for example, based on the lane in which the user's vehicle is currently present, the number of lanes of the road on which the user's vehicle is currently traveling, the speed of the user's vehicle, the congestion degree of the lane in which the user's vehicle is currently traveling, and the congestion degree of lanes parallel to the lane in which the user's vehicle is currently traveling.

The guidance module 54 may be a program module that allows the controller 20 to provide guidance. The guidance module 54 may enable the production of guidance voice data by combining voice data of sentence elements such as words or phrases and the output of the resultant guidance voice data to the speaker 14. The guidance module 54 may also enable the production of guidance information to the driver by displaying an arrow on a map image to indicate the traveling route determined by the route search module 52.

Figure 1:
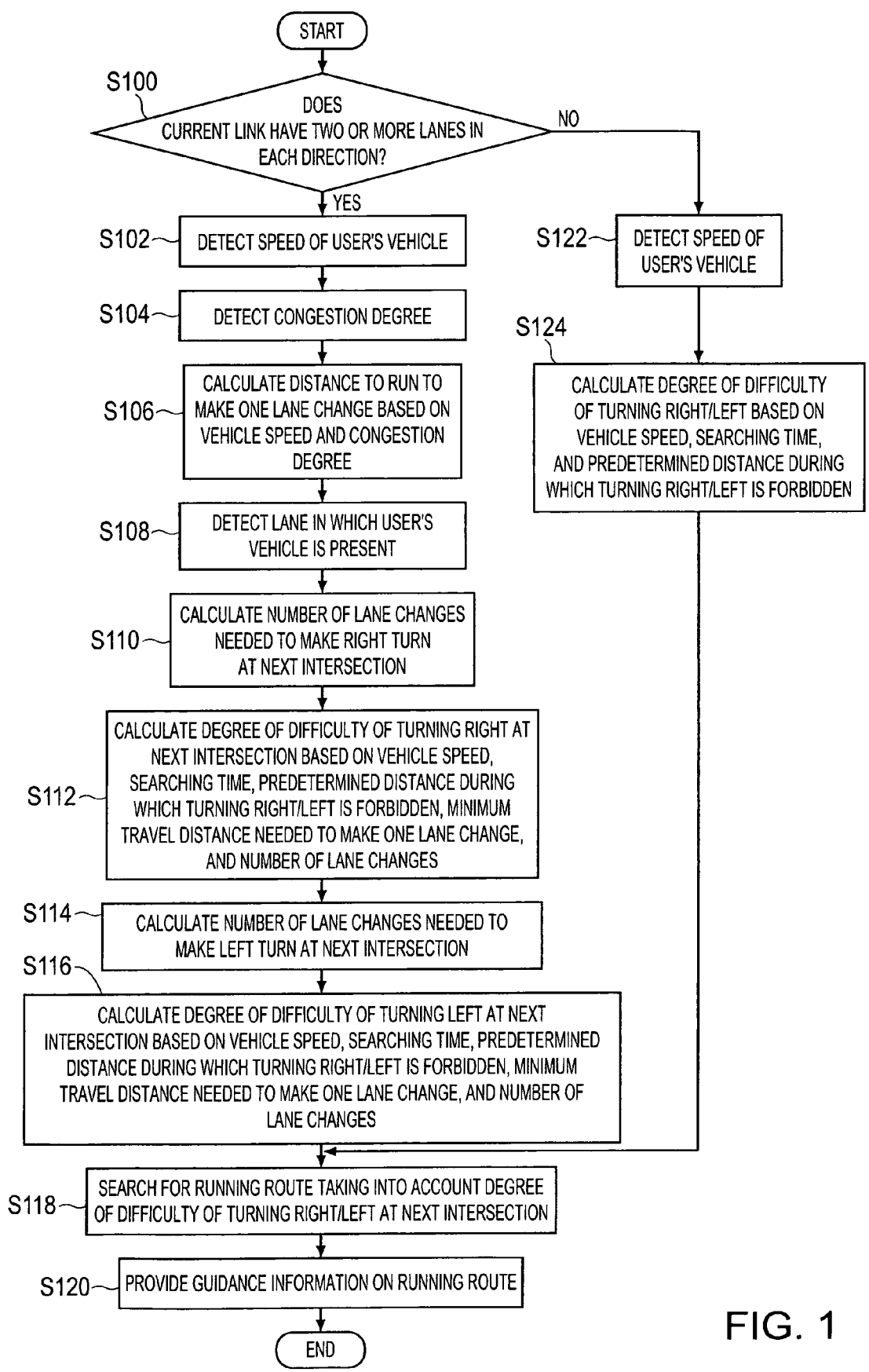
FIG. 1 is a flow chart showing an exemplary navigation method.

FIG. 1 is a flow chart showing an exemplary navigation method. The exemplary method may be implemented, for example, by one or more components of the above-described navigation system. However, even though the exemplary structure of the above-described navigation system may be referenced in the description, it should be appreciated that the structure is exemplary and the exemplary method need not be limited by any of the above-described exemplary structure.

The process shown in FIG. 1 may be performed by executing a control program after the current position of the user's vehicle on a road network is determined in a state in which the user's vehicle is traveling or is at rest. Specifically, the method shown in FIG. 1 may be executed in a situation in which, for example, the vehicle is traveling along a route determined via the route searching, a route re-search command is input when the user's vehicle is traveling, route re-searching is performed automatically when the vehicle has deviated from the determined route, and/or a route search command is input when the vehicle is stopping on a road shoulder.

As shown in FIG. 1, in step S100, the navigation system 1 may determine whether the link on which the user's vehicle is currently located has a plurality of lanes in each direction. Specifically, the controller 20 may detect the number of lanes available for vehicles to travel in the direction in which the user's vehicle is traveling by examining the map database in terms of the attribute information associated with the link corresponding to the road on which the user's vehicle is currently traveling, and may determine based on the detected number of lanes whether the current link has, for example, two or more lanes in each direction.

In step S102, the navigation system 1 may detect the speed of the user's vehicle by, for example, reading the output of the vehicle speed sensor 28. In step S104, the navigation system 1 may detect the congestion degree of lanes available for vehicles to travel in the direction in which the user's vehicle is traveling. Specifically, the controller 20 may detect the congestion degree, for example, by acquiring congestion information supplied from the traffic information center via road-vehicle communication using the communication unit 10 or may detect the congestion degree by acquiring traveling speeds of nearby vehicles via vehicle—vehicle communication using the communication unit 10.

The congestion degree may be expressed in levels. Specifically, if the congestion degree supplied from the traffic information center is expressed in levels, the supplied congestion degree may be directly used. On the other hand, if the congestion degree is determined based on the traveling speeds of the user's vehicle and nearby vehicles, the congestion level may be determined by comparing the detected traveling speeds with predetermined threshold values. For example, the congestion degree may be expressed in two levels such that when the traveling speed is less than 10 km/h, the congestion may be determined as being at a high level. Otherwise, the congestion may be determined as being at a low level.

In step S106, the navigation system 1 may calculates the traveling distance the user's vehicle should run to make one lane change (Ls), based on the congestion degree. Specifically, the traveling distance needed to make one lane change may be calculated according to equation (1) shown below.

$$Ls = As \times C \tag{1}$$

where As is a predetermined standard traveling distance needed to make one lane change and C is a lane change coefficient.

As shown in Table 1, when the lane in which the user's vehicle is traveling is not congested but a lane to which the user's vehicle is going to change from the current lane is congested, the distance the user's vehicle should travel before the lane change is completed after the driver decides to make the lane change may become longer. Conversely, when the lane in which the user's vehicle is currently traveling is congested, the distance the user's vehicle should travel to make a lane change after the driver decides to make the lane change becomes shorter regardless of the congestion degree of the lane to which the user's vehicle is going to change from the current lane.

In view of the above, the lane change coefficient C may be defined in advance, for example, such that the lane change coefficient C is set to 0.5, 1.5, and 1 for respective levels "short," "long," and "standard" of the distance determined, as shown in Table 1, depending on the congestion degree of the current lane and the congestion degree of the adjacent lane to which the vehicle will change. A table indicating the values of the lane change coefficient C in association with the congestion degree of the current lane and the congestion degree of the adjacent lane to which the vehicle will change may be is stored in the flash memory 18 or the memory 24 so that the value of the lane change coefficient C may be acquired by searching the table using the congestion degrees as search keys. Using the acquired value of the lane change coefficient C, the distance that the vehicle should travel to make one lane change can be calculated in accordance with equation (1). The congestion degree and the lane change coefficient C may be expressed in a greater number of levels than in the example described above to make it possible to more accurately estimate the distance that the vehicle should travel to make one lane change. Note that the distance that the vehicle should travel to make a lane change may be determined, for example, depending only on the congestion degree of a lane to which the vehicle will change without taking into account the congestion degree of the current lane.

TABLE 1

| Current lane | Adjacent lane | |
| --- | --- | --- |
|  | Congested | Not congested |
| Congested | Short | Short |
| Not congested | Long | Standard |

In step S108, the navigation system 1 may detect the lane in which the user's vehicle is currently located. Specifically, for example, the controller 20 may detect the lane in which the user's vehicle is currently located based on moving image data of a road surface behind the user's vehicle supplied from the camera unit 34 and the number of lanes detected from the map database 42.

In step S110, the navigation system 1 may calculate the number of lane changes needed to be made to turn right at a next intersection the user's vehicle is approaching. Specifically, assuming lanes available for vehicles to travel in the direction in which the user's vehicle is currently traveling are numbered in ascending order from the lane at the left-hand end to the lane at the right-hand end, the controller 20 may subtract the lane number of the lane in which the user's vehicle is currently traveling from the lane number of the lane at the right-hand end (that is, the number of lanes) of the lanes available for vehicle to run in the direction in which the user's vehicle is currently traveling. For example, in a situation shown in FIG. 4, there are three lanes available for vehicles to run in the direction in which the user's vehicle is currently traveling and the user's vehicle is traveling in the lane at the right-hand end. Thus, in this case, the number of lane changes needed to be made to turn right at a next intersection the user's vehicle is approaching is zero.

In step S112, the navigation system 1 may calculate the degree of difficulty of turning right at the next intersection based on the speed (V) of the user's vehicle, the searching time (Ts), the predetermined distance (D) during which turning right/left is forbidden, the distance (Ls) needed to run to make one lane change, and the number (N) of required lane changes. The searching time (Ts) is a predetermined time (for example, 1 sec) needed to, after the completion of the calculation of the degree of difficulty of turning right/left, search for an optimum traveling route and provide information associated with the optimum traveling route to the driver. The predetermined distance (D) during which turning right/left is forbidden is a predetermined distance (for example, 50 m) corresponding to a time needed for the driver to safely make a right/left turn after the driver receives a message instructing the driver to turn right or left. For example, the controller 20 may calculate the degree (Cr) of difficulty of turning right according to equation (2) shown below.

$$Cr = Ts \gt V + D + Ls1 + Ls2 + \ldots + Lsn \quad (2)$$

Where Ls1 is the distance required to make a first lane change, Ls2 is the distance required to make a second lane change, and Lsn is the distance required to make an n-th lane change.

For example, if the speed (V) of the user's vehicle is 10 m/s, the searching time is 1 sec, the predetermined distance (D) during which turning right/left is forbidden is 50 m, the total number of required lane changes (N) is 2, the distance (L1) to make the first lane change is 60 m, and the distance (L2) to make the second lane change is 20 m, then the degree (Cr) of difficulty of turning right is calculated as 140 m according to equation (3) as shown below.

$$Cr = 1 \times 10 + 50 + 60 + 20 = 140 \quad (3)$$

The distance during which turning right/left is forbidden may be set in advance to a fixed value including the searching time, or the distance during which turning right/left is forbidden may be dynamically determined depending on the speed of the user's vehicle.

Returning to FIG. 1, step S114 and step S116, are performed in a similar manner to step S110 and S112 described above. In step S118, the navigation system 1 may search for an optimum traveling route depending on the degree of difficulty of turning right/left at a next intersection the user's vehicle is approaching. A first method of performing the search may involve detecting the distance from the position of the user's vehicle to the next intersection the user's vehicle is approaching, and comparing the detected distance with the distance determined as the degree of difficulty of turning right or left. If the distance from the current vehicle position to the next intersection is smaller than the distance determined as the degree of difficulty of turning right, a route including a link that turns right at the next intersection is discarded from candidates for routes to be selected. If the distance from the current vehicle position to the next intersection is smaller than the distance determined as the degree of difficulty of turning left, a route including a link that turns left at the next intersection is discarded from candidates for routes to be selected. In the first method, when the degree of difficulty of turning right at the next intersection is high, if the route that turns right at the next intersection is discarded, a selection of any other alternative route results in an unallowable increase in the total route length, the route that turns right at the next intersection may still be selected as a recommended route. In this case, for example, the route length that is the least of all possible routes passing through a path turning right at the next intersection is compared with the route length that is the least of all possible routes that do not include the path turning right at the next intersection, and, if the latter least route length is greater than the former least route length by an amount equal to or greater than a predetermined value, the controller 20 may selects the route that turns right at the next intersection.

On the other hand, according to a second method, the length of the route including the link with the high degree of difficulty of turning right/left may be calculated to be greater than the actual physical length of the route, and a route with a least route length is searched for in accordance with the calculation. Specifically, for example, the distance calculated as the degree of difficulty of turning right/left is added to the physical length of the route including the path with the high degree of difficulty of turning right/left, and the resultant sum is regarded as the effective length for the route including the path with the high degree of difficulty of turning right/left. Then, a route with a least length is searched for. In the calculation of the degree of difficulty of turning right/left, the value calculated according to the above-described equation may be multiplied by a particular coefficient, or the degree of difficulty, the speed of the user's vehicle, and/or the number of lane changes may be weighted by proper factors.

Figure 4:
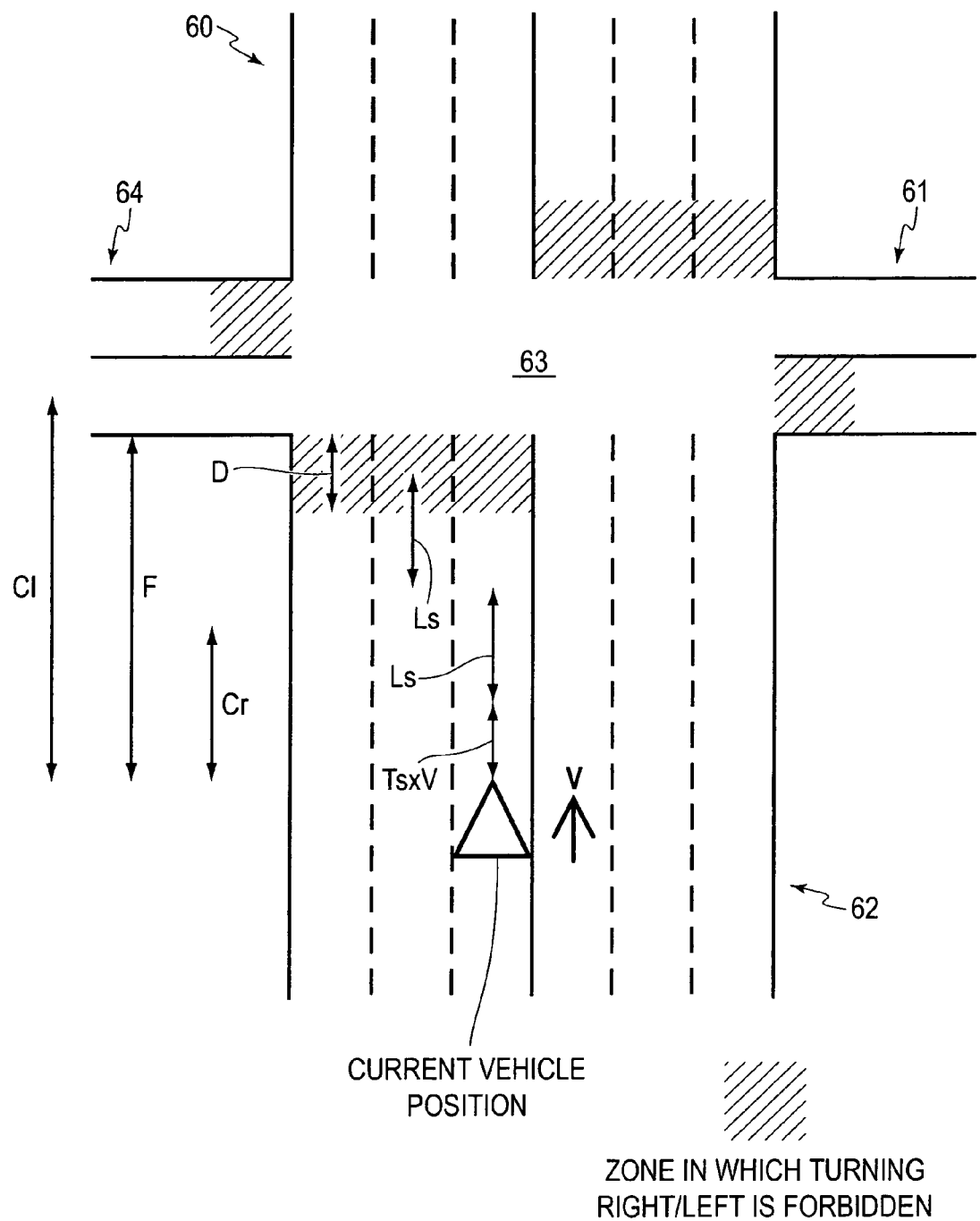
FIG. 4 is a schematic diagram showing an exemplary traveling circumstance.
Figure 5:
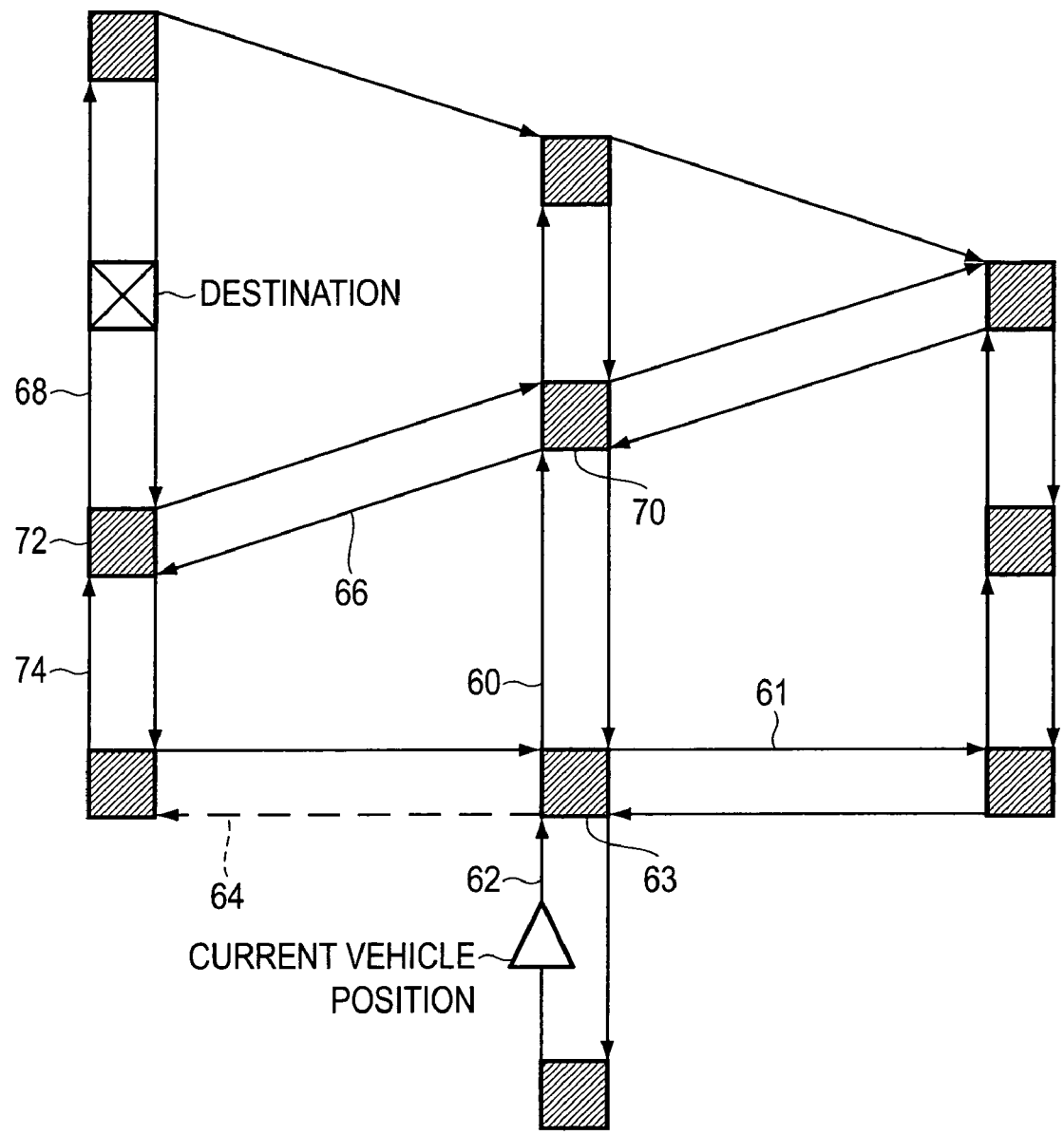
FIG. 5 is a schematic diagram showing an exemplary traveling circumstance.

The first method is described in further detail below with reference to FIGS. 4 and 5. In the situation shown in FIGS. 4 and 5, because the distance F from the current position of the user's vehicle to the closest intersection the user's vehicle is approaching is smaller than the degree Cl of difficulty of turning left, the route searching is performed under the condition that a link 64 turning left at the next intersection is discarded from candidates for the route. As a result, a route is selected which passes straight through a node 63 at which the next intersection is located, passes through a link 60, turns left at a node 70 at which there is another intersection, passes through a link 66, turns right a node 72 at which there is an intersection, and finally reaches a destination located on a link 68. In this route searching process, for example, if the sum of the length of the link 60 and the length of the link 66 is greater than the sum of the length of the link 64 and the length of the link 74 to a an unallowable degree, and if the distance F from the current vehicle position to the closest intersection the user's vehicle is approaching is greater than the predetermined distance during which turning right/left is forbidden, a route passing through the link 64 and the link 74 may be selected as the recommended traveling route instead of the route passing through the link 60 and the link 66.

In step S120, the navigation system 1 may provide guidance information on the selected traveling route. Specifically, for example, the controller 20 may control the speaker 14 to output a voice to instruct the driver whether to go straight or turn right or left at each intersection and may also control the display 12 so as to display an arrow on the map to indicate the direction in which the vehicle should travel.

According to the examples described above, the degree of difficulty of turning right or left at a closest intersection a user's vehicle is approaching can be accurately determined depending on the lane in which the user's vehicle is currently located, and thus it is possible to provide an traveling route selected depending on the degree of difficulty of turning right or left at that intersection. Although in the examples described above, the degree of difficulty of turning right/left at a closest intersection a user's vehicle is approaching is determined, and a traveling route is suggested depending on the degree of difficulty of turning right/left at that intersection, the degree of difficulty of turning right/left at a second or subsequent intersection may be determined, and an optimum traveling route may be selected depending on the determined degree of difficulty.

Also in the case in which the optimum traveling route is selected depending on the degree of difficulty of turning right/left at a second or subsequent intersection, as in the example described above, if the distance determined as the degree of difficulty of turning right/left is greater than the physical distance from the current vehicle position to that intersection, a route including a path turning right/left at that intersection may be discarded from candidates for the traveling route in the route searching process, or the traveling route including the path turning right/left at that intersection may be changed depending on the degree of difficulty of turning right/left so as to select a more proper traveling route.

Note that the order of performing the steps of the navigation method is not limited to the order described herein with reference to the embodiment, but the steps may be performed in an arbitrary order or may be performed concurrently unless there is a particular technical problem. Furthermore, in the present invention, the function of each means may be realized by a hardware resource with a physical structure adapted to realize the function, a hardware resource adapted to realize the function by means of a program, or a combination thereof. The respective functions of means are not limited to those realized by hardware resources realized in physically separated forms. Also note that not only the method disclosed herein but also a program for implementing the method and a storage medium on which the program is stored also fall within the scope of the present invention.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A navigation system for a vehicle, comprising:
a controller that:
   detects a number of travel lanes available for traveling in a direction that the vehicle is traveling;
   detects a lane in which the vehicle is currently located;
   determines a congestion degree for each of the available travel lanes;
   determines a degree of difficulty of turning right or left at a next intersection that the vehicle is approaching, based on the detected number of available travel lanes, the detected lane in which the vehicle is currently located, and the detected congestion degree;
   selects a travel route in accordance with the determined degree of difficulty; and
   provides guidance information on the selected travel route.

2. The navigation system claim 1, wherein the controller:
detects a congestion degree of a lane to which the vehicle can change; and
determines the degree of difficulty of turning right or left based on the detected congestion degree of the lane to which the vehicle can change.

3. The navigation system claim 2, wherein the controller detects the congestion degree of the lane to which the vehicle can change by determining the speed of another vehicle traveling in the lane to which the vehicle can change.

4. The navigation system claim 1, wherein the controller:
detects a congestion degree of the lane in which the vehicle is located;
detects a congestion degree of a lane to which the vehicle can change; and
determines the degree of difficulty of turning right or left based on the congestion degree of the lane in which the vehicle is located and the congestion degree of the lane to which the vehicle can change.

5. The navigation system claim 1, wherein:
the degree of difficulty is expressed in terms of distance; and
the controller excludes from possible routes to be selected a candidate route that requires turning right or left at the next intersection if the degree of difficulty is greater than the actual distance to the next intersection.

6. The navigation system claim 5, wherein the controller:
selects the excluded candidate route as the travel route if respective lengths of the other possible routes are a predetermined distance longer than the excluded candidate route.

7. The navigation system claim 1, wherein:
the degree of difficulty is expressed in terms of distance; and
the controller adds the degree of difficulty to the actual length of each candidate route that requires turning right or left at the next intersection.

8. The navigation system claim 1, wherein the controller determines the congestion degree by communicating with a traffic information center.

9. The navigation system claim 1, wherein the controller:
detects an number of lane changes required to turn right or left; and
determines the degree of difficulty based on the number of lane changes.

10. A navigation method for a vehicle, comprising:
detecting a number of travel lanes available for traveling in a direction that the vehicle is traveling;
detecting a lane in which the vehicle is currently located;
determining a congestion degree for each of the available travel lanes;
determining a degree of difficulty of turning right or left at a next intersection that the vehicle is approaching, based on the detected number of available travel lanes, the detected lane in which the vehicle is currently located, and the detected congestion degree;
selecting a travel route in accordance with the determined degree of difficulty; and
providing guidance information on the selected travel route.

11. The navigation method claim 10, wherein:
determining the congestion degree comprises determining a congestion degree of a lane to which the vehicle can change; and
determining the degree of difficulty comprises determining the degree of difficulty of turning right or left based on the detected congestion degree of the lane to which the vehicle can change.

12. The navigation method claim 11, wherein determining the congestion degree of the lane to which the vehicle can change comprises determining the speed of another vehicle traveling in the lane to which the vehicle can change.

13. The navigation method claim 10, wherein:
determining the congestion degree comprises determining a congestion degree of the lane in which the vehicle is located;
determining the congestion degree determining a congestion degree of a lane to which the vehicle can change; and
determining the degree of difficulty comprises determining the degree of difficulty of turning right or left based on the congestion degree of the lane in which the vehicle is located and the congestion degree of the lane to which the vehicle can change.

14. The navigation method claim 10, wherein:
the degree of difficulty is expressed in terms of distance; and
selecting the travel route comprises excluding from possible routes to be selected a candidate route that requires turning right or left at the next intersection if the degree of difficulty is greater than the actual distance to the next intersection.

15. The navigation method claim 14, wherein:
selecting the travel route comprises selecting the excluded candidate route as the travel route if respective lengths of the other possible routes are a predetermined distance longer than the excluded candidate route.

16. The navigation method claim 10, wherein:
the degree of difficulty is expressed in terms of distance; and
the method further comprises adding the degree of difficulty to the actual length of each candidate route that requires turning right or left at the next intersection.

17. The navigation method claim 10, wherein:
determining the congestion degree comprises determining the congestion degree by communicating with a traffic information center.

18. The navigation method claim 10, further comprising:
detecting a number of lane changes required to turn right or left;
wherein determining the degree of difficulty comprises determining the degree of difficulty based on the number of lane changes.

19. A storage medium storing a set of program instructions executable on a data processing device, the program instructions usable to implement the method of claim 1.

20. A navigation system for a vehicle, comprising:
means for detecting a number of travel lanes available for traveling in a direction that the vehicle is traveling;
means for detecting a lane in which the vehicle is currently located;
means for determining a congestion degree for each of the available travel lanes;
means for determining a degree of difficulty of turning right or left at a next intersection that the vehicle is approaching, based on the detected number of available travel lanes, the detected lane in which the vehicle is currently located, and the detected congestion degree for each of the available travel lanes;
means for selecting a travel route in accordance with the determined degree of difficulty; and
means for providing guidance information on the selected travel route.

* * * * *